UNITED STATES PATENT OFFICE.

GURDON CONKLING, OF GLENS FALLS, NEW YORK.

PROCESS OF TREATING IRON ORE.

SPECIFICATION forming part of Letters Patent No. 387,554, dated August 7, 1888.

Application filed May 26, 1887. Serial No. 239,466. (No model.)

*To all whom it may concern:*

Be it known that I, GURDON CONKLING, a citizen of the United States, residing at Glens Falls, in the county of Warren and State of New York, have invented new and useful Improvements in Processes for Treating Iron Ores Containing Phosphorus and Titanium, of which the following is a specification.

The object of this invention is to remove from magnetic-iron ores the phosphorus (opatite) or titanium contained therein in an economical manner and to such an extent that the purified ore can be used successfully in the manufacture of steel.

It is a well-known fact that a small percentage of phosphorus or of titanium, or of both, contained in iron ore renders the same unfit for the manufacture of steel, and many attempts have been made to remove the phosphorus or titanium, but without practical success. If the ore is simply crushed, a large number of particles remain which contain iron and also some phosphorus or titanium, or both, and if the crushed mass is treated with magnets such particles are attracted and the result is a failure, and if the ore, after having been crushed, is passed over a sieve or screen of any desired fineness, in order to eliminate the coarse particles from the fine, and the fine particles which pass through the sieve are exposed to the action of magnets, the result obtained is pure enough to be used in the manufacture of steel; but a large percentage of iron is lost and the process is rendered impracticable from an economical standpoint.

In order to remove from iron ore the phosphorus or titanium in an economical manner, I proceed as follows: I first crush or pulverize the ore to such a fineness as will mechanically separate the greater portion of the ore from the gangue in the crushing process; then I concentrate the pulverized mass by specific gravity in air or water, as hereinafter more fully set forth, taking out as much of the iron as is consistent with fair work, while as much of the phosphorus or titanium remains in the concentrated mass as cannot be helped without wasting too much of the iron. By this concentration a very large percentage of the earthy matters is removed, while the particles, whether large or small, which contain iron are retained. The concentration by specific gravity in air or water is effected by exposing the pulverized mass to currents of air or of water moving in one direction, while the crushed particles fall or move through the air or water in a different direction, the operation being similar in principle to that employed in winnowing grain or in washing auriferous earth. After the concentration has been carried on to the desired extent, I pass the concentrated mass over a sieve or screen, whereby the coarse particles are separated from the fine particles, the former passing over the screen, while the latter pass through the meshes of the screen. The fineness of the screen used during this step of my process depends upon the nature of the ore, and in some cases I have used screens containing twenty meshes to the inch, while in other cases I may use screens containing only eight meshes to the inch. After the concentrated mass has thus been separated into a fine heap and a coarse heap, I expose the particles which form the fine heap to the action of magnets, (electromagnets being used by preference,) and since by the preceding concentration a large percentage of the gangue has been removed, the extraction of the iron contained in the fine heap by means of the magnets can be accomplished in a comparatively short time. The coarse heap which has been eliminated by the screening process contains all those particles which, on account of their specific gravity, did not become eliminated by the concentrating process, and which are composed of pure iron ore mixed with particles of phosphorus or titanium. If this coarse heap would be exposed at once to the action of magnets the result obtained would be liable to contain such a percentage of phosphorus or titanium that it would remain unfit for the manufacture of steel. For this reason I recrush the coarse heap, and by this recrushing process a large percentage of the phosphorus or titanium which adheres to the iron-ore particles becomes detached therefrom, and if the recrushed mass is exposed to the action of magnets the result obtained is free enough from phosphorus or titanium to render the same fit to be used in the manufacture of steel.

By my process I have succeeded in reducing iron ore containing 0.600 per cent. of phosphorus—that is to say, in one hundred pounds of iron ore 0.600 per cent. pounds of phosphorus—to 0.040 per cent. phosphorus with an iron-ore result of 71.45 per cent. metallic iron, which shows that a practical result can be attained without causing too much expense to render the process impracticable from an economical point of view. The iron, after having been eliminated in the manner above described, forms a mass of fine particles, and in order to render the same suitable for furnace-work I mix it with a binding material—such, for instance, as the refuse of gas-houses, refuse of petroleum, or lime and water, so as to form a plastic mass, which is afterward formed into bricks or lumps of convenient size for furnace-work.

Heretofore a process has been devised which consists in the following steps: first, pulverizing the ore; second, concentrating by specific gravity by an air-blast, and, third, passing the ore upon an apron or wire-cloth and exposing it to the action of a magnet; but in this case the magnetic ore passing over the foraminous apron is subjected to the action of the magnet while still upon the apron, whereas the process claimed by me exposes the ore, after passing through the sieve, to the action of magnets, whereby I avoid the presence of particles containing an excess of phosphorus.

What I claim as new, and desire to secure by Letters Patent, is—

1. The process of treating iron ore containing phosphorus or titanium, or both, which consists in first crushing the ore, then concentrating the same by specific gravity, then separating the particles of the concentrated ore according to their fineness, and, finally, exposing the fine particles resulting from this separation to the action of magnets, substantially as described.

2. The process of treating iron ore containing phosphorus or titanium, or both, which consists in first crushing the ore, then concentrating the same by specific gravity, then passing the concentrated mass over a sieve or screen, then recrushing the particles which pass over the screen, and, finally, exposing the recrushed particles to the action of magnets.

In testimony whereof I have hereunto set my hand and seal in the presence of two subscribing witnesses.

GURDON CONKLING. [L. S.]

Witnesses:
W. HAUFF,
E. F. KASTENHUBER.